(12) United States Patent
Shah et al.

(10) Patent No.: US 9,147,176 B2
(45) Date of Patent: *Sep. 29, 2015

(54) SMART STORAGE SYSTEM

(71) Applicant: Trimble Navigation Limited, Sunnyvale, CA (US)

(72) Inventors: Satyan P. Shah, Bedford, MA (US); Harry F. Tsai, Somerville, MA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/553,621

(22) Filed: Nov. 25, 2014

(65) Prior Publication Data

US 2015/0076227 A1    Mar. 19, 2015

Related U.S. Application Data

(63) Continuation of application No. 13/951,849, filed on Jul. 26, 2013, now Pat. No. 8,915,430.

(60) Provisional application No. 61/809,214, filed on Apr. 5, 2013.

(51) Int. Cl.
| | |
|---|---|
| *G06K 7/00* | (2006.01) |
| *G06Q 10/08* | (2012.01) |
| *G06K 7/06* | (2006.01) |
| *G06K 7/08* | (2006.01) |
| *G06K 7/10* | (2006.01) |
| *G06K 17/00* | (2006.01) |

(52) U.S. Cl.
CPC .............. *G06Q 10/087* (2013.01); *G06K 7/065* (2013.01); *G06K 7/08* (2013.01); *G06K 7/10009* (2013.01); *G06K 17/0022* (2013.01)

(58) Field of Classification Search
USPC .......................... 235/435, 439, 454, 487, 492
See application file for complete search history.

(56) References Cited

U.S. PATENT DOCUMENTS

| | | | |
|---|---|---|---|
| 7,535,337 B2 | 5/2009 | Overhultz et al. | |
| 7,584,016 B2 | 9/2009 | Weaver | |
| 8,915,430 B2 * | 12/2014 | Shah et al. | 235/383 |
| 2002/0146282 A1 | 10/2002 | Wilkes et al. | |
| 2006/0164247 A1 | 7/2006 | Overhultz et al. | |
| 2009/0020601 A1 | 1/2009 | Woodbury et al. | |
| 2010/0049635 A1 | 2/2010 | Delaney et al. | |

OTHER PUBLICATIONS

International Search Report and Written Opinion for PCT Application No. PCT/US2014/032509, mailed on Jul. 18, 2014, 9 pages.

\* cited by examiner

*Primary Examiner* — Matthew Mikels
(74) *Attorney, Agent, or Firm* — Kilpatrick Townsend & Stockton LLP

(57) ABSTRACT

A system for identifying different types of products on a display hanger and determining a quantity of each of the different types of products includes a plurality of electrically conductive segments coupled to the display hanger, an electrically conductive rail coupled to the display hanger, and a sensor device electrically coupled to each of the plurality of electrically conductive segments and to the electrically conductive rail. The sensor device is configured to identify the different types of products on the display hanger and to determine the quantity of each of the different types of products based on a unique electrical signature associated with each of the different types of products.

20 Claims, 6 Drawing Sheets

SMART STORAGE SYSTEM

CROSS-REFERENCE TO RELATED APPLICATIONS

This application is a continuation of U.S. patent application Ser. No. 13/951,849, filed Jul. 26, 2013, which claims priority to U.S. Provisional Patent Application No. 61/809,214, filed Apr. 5, 2013, the entire contents of both of which are incorporated herein by reference in their entirety for all purposes.

BACKGROUND

The present invention relates generally to monitoring inventory levels and, more particularly, to identifying types of products and determining a quantity of each of the types of products on a particular surface (e.g., hanging on a display hanger).

Typical inventory monitoring procedures may involve an employee using a barcode reader to physically scan a stock-keeping unit (SKU) of each product or of each type of product in a store. More advanced inventory monitoring procedures may involve attaching an electronically readable tag circuit (e.g., a radio frequency identification (RFID) tag circuit) to each product and using a wireless reader to identify each of the tag circuits. Other methods also exist. Each method provides trade-offs between various considerations such as cost, accuracy, speed, frequency, and other considerations. As an example, using electronically readable tag circuits can reduce inventory monitoring time because multiple tags can be read simultaneously (even those that are not visible to the wireless reader device). However, using electronically readable tag circuits is generally more costly because each product has to be tagged and the tag circuits are generally not reusable.

Thus, improved systems and methods are continually sought that provide more favorable trade-offs for inventory monitoring.

SUMMARY

Some embodiments of the present invention provide accurate and low-cost systems and methods for monitoring inventory levels or determining product (or asset) location by sensing one or more unique characteristics of the product or of a package associated with the product (e.g., the product's packaging). For example, in accordance with an embodiment of the present invention, a system for identifying different types of products on a display hanger and determining a quantity of each of the different types of products includes a plurality of electrically conductive segments coupled to the display hanger. The plurality of electrically conductive segments may each be electrically isolated from others of the plurality of electrically conductive segments. An electrically conductive rail is coupled to the display hanger. The electrically conductive rail is disposed adjacent to and electrically isolated from each of the plurality of electrically conductive segments. A sensor device is electrically coupled to each of the plurality of electrically conductive segments and to the electrically conductive rail. The sensor device is configured to identify the different types of products on the display hanger based on a unique electrical signature associated with each of the different types of products. Each product supported by the display hanger provides an electrical connection between at least one of the plurality of electrically conductive segments and the electrically conductive rail. The electrical signature of each product is determined based on an electrical property of a portion of the product or a portion of a package associated with the product forming the electrical connection. The electrical signature is determined at the sensor device by providing an electrical input to either each of the electrically conductive segments or to the electrically conductive rail and receiving an electrical response from those of the plurality of electrically conductive segments having the electrical connection. The sensor device is also configured to determine the quantity of each of the different types of products on the display hanger based on the electrical signature associated with each electrical connection and a number of the plurality of electrically conductive segments having the electrical connection.

In an embodiment, the plurality of electrically conductive segments and the electrically conductive rail are disposed on an insulating film that is coupled to the display hanger using an adhesive.

In another embodiment, the plurality of electrically conductive segments and the electrically conductive rail comprise a conductive ink.

In some embodiments, the electrical signature associated with each of the different types of products is an electrical resistance. In other embodiments, the electrical signature associated with each of the different types of products is an electrical capacitance.

In another embodiment, the electrical input provided by the sensor device is a time-varying electrical signal, and the electrical signature associated with each of the different types of products is an inductance.

In another embodiment, the sensor device includes a radio frequency identification tag configured to communicate the identity of the different types of products and the quantity of each of the different types of products to an RFID reader device.

In accordance with yet another embodiment, the sensor device is configured to wirelessly communicate the identity of the different types of products and the quantity of each of the different types of products to a computing device using a Bluetooth, WiFi, ZigBee, or the like communication protocol.

In accordance with another embodiment of the present invention, a product monitoring system for identifying types of products on a display hanger and determining a quantity of each of the types of products includes a plurality of electrically conductive segments coupled to the display hanger. The plurality of electrically conductive segments may each be electrically isolated from others of the plurality of electrically conductive segments. An electrically conductive rail is coupled to the display hanger. The electrically conductive rail is disposed adjacent to and electrically isolated from each of the plurality of electrically conductive segments. A sensor device is electrically coupled to each of the plurality of electrically conductive segments and to the electrically conductive rail. One or more products are supported by the display hanger. Each product or a package associated with each product provides an electrical connection between at least one of the plurality of electrically conductive segments and the electrically conductive rail. Each different type of product or the package associated with each different type of product has a different electrical property. The sensor device is configured to identify the types of the one or more products based on a unique electrical signature associated with the different electrical property. The electrical signature is determined at the sensor device by providing an electrical input to either each of the electrically conductive segments or to the electrically conductive rail and receiving an electrical response from those of the plurality of electrically conductive segments having the electrical connection. The sensor device is also configured to determine the quantity of each of the types of products based on the electrical signature associated with each electrical connection and a number of the plurality of electrically conductive segments having the electrical connection.

In some embodiments, the package associated with each product has electrical contacts disposed along an area of contact between the package and the display hanger, where one electrical contact is disposed to contact at least one of the electrically conductive segments and one electrical contact is disposed to contact the electrically conductive rail. In other embodiments, the electrical contacts are connected with a conductive ink on the package that provides each different type of product with the different electrical property.

In accordance with yet another embodiment of the present invention, a method of identifying different types of products on a display hanger and determining a quantity of each of the different types of products includes providing an electrical input to an electrically conductive rail coupled to the display hanger. An electrical response is received from one or more electrically conductive segments of a plurality of electrically conductive segments coupled to the display hanger. The plurality of electrically conductive segments are each electrically isolated from others of the plurality of electrically conductive segments and disposed adjacent to and electrically isolated from the electrically conductive rail. Products supported by the display hanger provide an electrical connection between the one or more electrically conductive segments and the electrically conductive rail. The different types of products on the display hanger are identified based on the electrical response from each of the one or more electrically conductive segments. The electrical response from each of the one or more electrically conductive segments provides a unique electrical signature associated with each of the different types of products. The quantity of each of the different types of products on the display hanger is determined.

In an embodiment, the electrical signature associated with each of the different types of products is determined based on an electrical property of a portion of the product or a portion of a package associated with the product forming the electrical connection.

These and other embodiments are described in further detail below in conjunction with the drawings.

DETAILED DESCRIPTION

Some embodiments of the present invention enable use of a unique physical characteristic of a product or of a product's packaging to identify each product that has been placed in (or exists in) a storage system. Examples of unique physical characteristics include electrical resistance, impedance, capacitance, resonance, weight, color, and the like. Examples of storage systems in which embodiments of the invention may be used include display hangers (e.g., pegs), display shelves, pop up displays, and the like.

As explained above, some more advanced wireless inventory monitoring systems attach an electronically readable tag circuit to each product. Some of these systems (e.g., real-time locating systems (RTLSs)) also require an infrastructure of fixed wireless readers to identify and track each tag circuit. In contrast, embodiments of the present invention embed electronic components into a storage system rather than into a product or packaging. The storage system can employ one or more sensors to identify a physical characteristic of the product or packaging. In some embodiments, sensors may contact the product or packaging (e.g., to make a resistance measurement). In other embodiments, sensors may not contact the product or packaging (e.g., to make a frequency resonance or optical measurement). An advantage is that unique physical characteristics may already exist, so the product and/or packaging may remain unaltered. If an alteration is required, it is usually significantly cheaper and more efficient than attaching an electronic tag circuit to each product.

Figure 1:
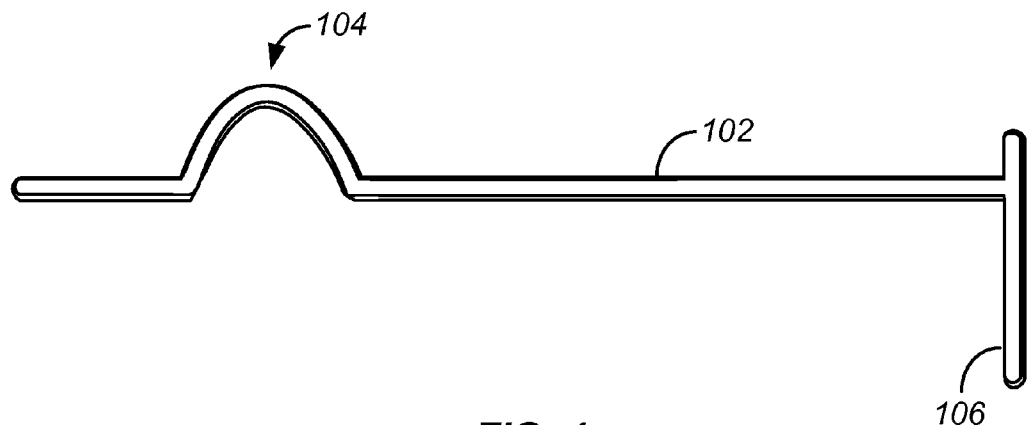
FIG. 1 is a simplified side-view of a typical display hanger (also referred to as a gridwall hook) that may be used in accordance with an embodiment of the invention.

FIG. 1 is a simplified side-view of a typical display hanger or gridwall hook that may be used in accordance with an embodiment of the invention. The display hanger may be of the type that is regularly placed near check-out stands in large department stores carrying products such as bubblegum, lip gloss, batteries, etc. In FIG. 1, the display hanger includes a portion 102 where products are stored and a choke-point 104 to keep the products from falling off the display hanger. The choke-point 104 may also aid in inventory control. The display hanger also includes a base portion 106 that is typically used to attach the display hanger to a wall or display stand. The base portion 106 may attach to the wall or display stand in any manner (e.g., pegs that attach to a gridwall). It should be appreciated that this example is provided for illustrative purposes only, and embodiments of the prevent invention are not limited to display hangers of a particular shape or design.

Figure 2:
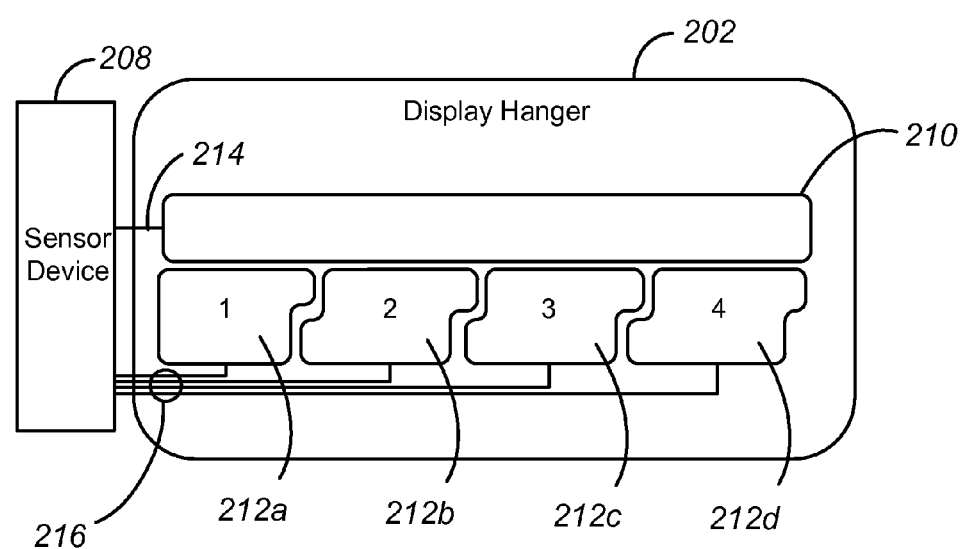
FIG. 2 is a simplified block diagram of a storage system in accordance with an embodiment of the invention.

FIG. 2 is a simplified block diagram of a storage system in accordance with an embodiment of the invention. The storage system in this example includes a portion of a display hanger that may be used to support different types of products. The display hanger includes a portion 202 where products are stored. The storage system can be used for identifying the different types of products on the display hanger and for determining a quantity of each of the different types of products.

The display hanger in this example includes four electrically conductive segments 212a-212d. Embodiments of the present invention are not so limited, however, and may include any number of electrically conductive segments depending on the particular application. The electrically conductive segments 212a-212d are electrically isolated from each other as indicated by the spaces between each of the electrically conductive segments 212a-212d.

The display hanger in this example also includes an electrically conductive rail 210. As can be seen in this figure, the electrically conductive rail 210 is disposed adjacent to and electrically isolated from each of the plurality of electrically conductive segments 212a-212d.

The electrically conductive segments 212a-212d and the electrically conductive rail 210 may be formed in any manner. Merely by way of example, in an embodiment the electrically conductive segments 212a-212d and the electrically conductive rail 210 are formed on an insulating film (e.g., a plastic) using a conductive ink, and the insulating film is coupled to the display hanger using an adhesive.

The storage system in this example also includes a sensor device 208 that is electrically coupled to each of the plurality of electrically conductive segments 212a-212d via connections 216 and to the electrically conductive rail 210 via connection 214. In some embodiments, the sensor device 208 may include an RFID tag circuit and be configured to communicate the identity of the different types of products and the quantity of each of the different types of products to an RFID reader device. In other embodiments, the sensor device 208 may be configured to wirelessly communicate the identity of the different types of products and the quantity of each of the different types of products to a computing device using a Bluetooth, WiFi, ZigBee, or the like communication protocol.

In accordance with some embodiments of the invention, the sensor device 208 may be configured to identify the different types of products on the display hanger based on a unique electrical signature associated with each of the different types of products. Each product supported by the display hanger may provide an electrical connection between at least one of the electrically conductive segments 212a-212d and the electrically conductive rail 210. The electrical signature of each product may be determined based on an electrical property of a portion of the product or a portion of a package forming the electrical connection. The electrical signature may be determined at the sensor device 208 by providing an electrical input to either each of the electrically conductive segments 212a-212d or to the electrically conductive rail 210 and receiving an electrical response. The electrical response is received only from those of the electrically conductive segments 212a-212d that have an electrical connection to the electrically conductive rail 210.

The sensor device 208 may also be configured to determine the quantity of each of the different types of products on the display hanger. The quantity may be determined based on the electrical signature associated with each of the electrical connections and a number of the electrically conductive segments 212a-212d that have an electrical connection to the electrically conductive rail 210.

A location of the sensor device 208 with regard to the display hanger is not limited. Merely by way of example, in some embodiments the sensor device may be coupled 208 to a plate of the display hanger (such as base portion 106 shown in FIG. 1), while in other embodiments the sensor device 208 may be coupled to a wall of the display to which the display hanger is attached (either on the front or the back of the wall).

Figure 3:
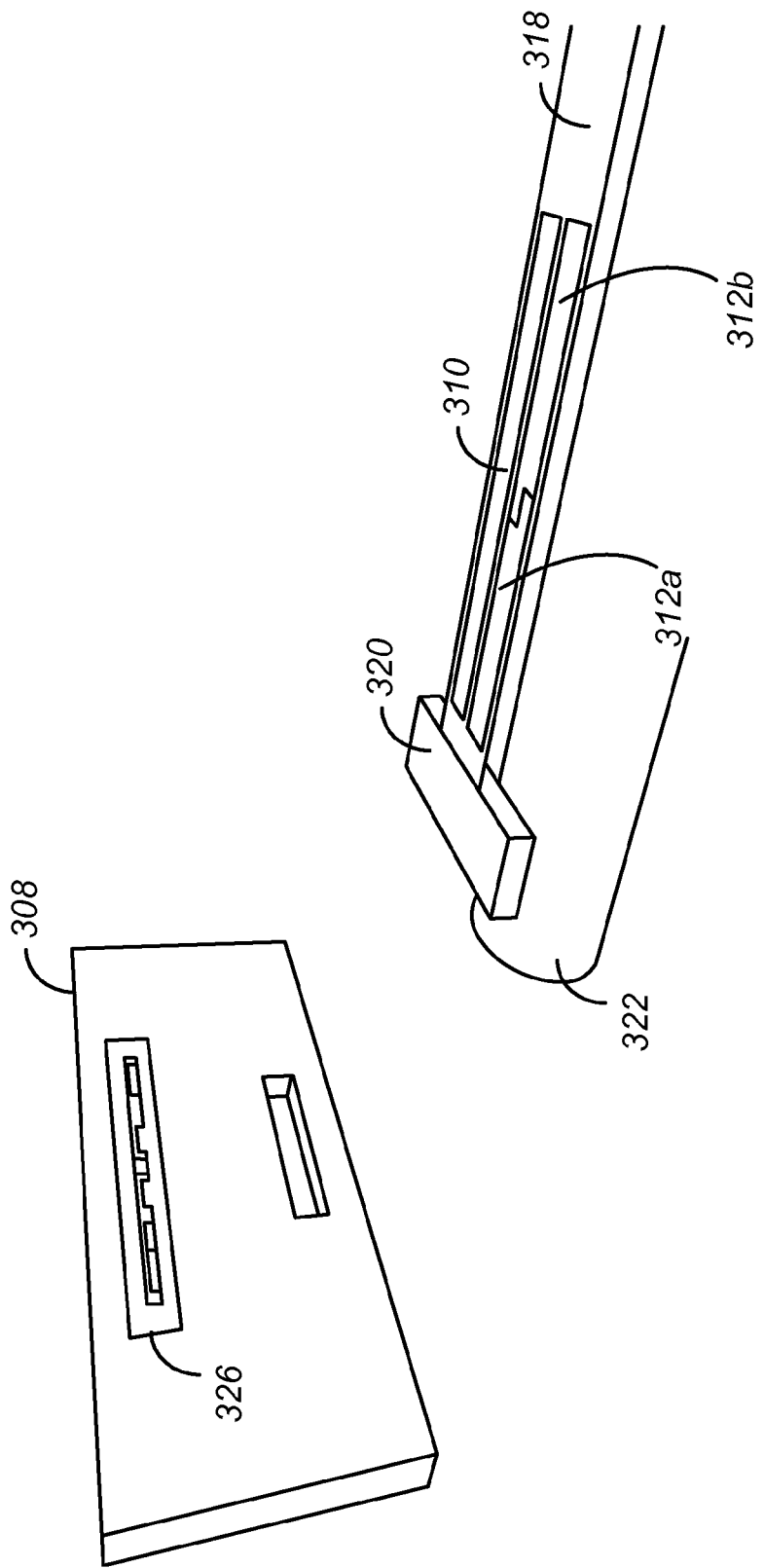
FIG. 3 is a simplified perspective view of a storage system in accordance with an embodiment of the invention.

FIG. 3 is a simplified perspective view of a storage system in accordance with an embodiment of the invention. This figure provides another example showing a portion 322 of a tubular shaped display hanger. This example shows how a conventional display hanger may be retrofitted in accordance with embodiments of the invention. This example shows two electrically conductive segments 312a, 312b and an electrically conductive rail 310. These components may be formed on an insulating film 318 and may be attached to the display hanger using an adhesive. A connector 320 (e.g., a ribbon connector) may be used to couple the components with receiving portion 326 of a sensor device 308.

Figure 4:
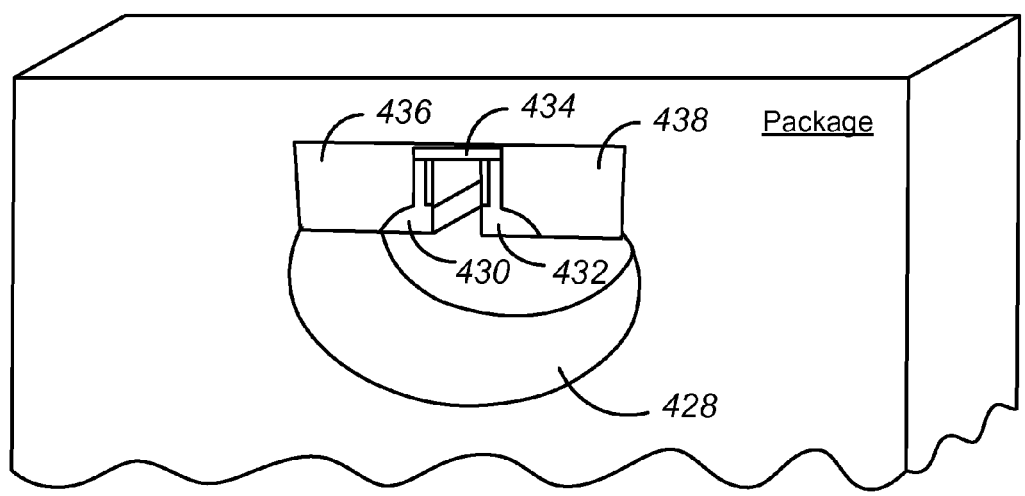
FIG. 4 is a simplified diagram of a portion of a product package in accordance with an embodiment of the invention.

FIG. 4 is a simplified diagram of a portion of a product package in accordance with an embodiment of the invention. It should be appreciated that this example is provided for illustrative purposes only, and embodiments of the present invention are not limited to product packages of a particular shape or design. The package in this example can be hung on a display hanger using the hole 428 extending through the package. This example illustrates that the package can include electrical contacts 430, 432 disposed along an area of contact between the package and the display hanger. One of the electrical contacts 430, 432 is disposed to contact at least one of the electrically conductive segments, and one of the electrical contacts 430, 432 is disposed to contact the electrically conductive rail. A connection 434 between the electrical contacts 430, 432 can provide an electrical connection between at least one of the electrically conductive segments and the electrically conductive rail.

The connection 434 between the electrical contacts 430, 432 can be used to provide each different type of product with a different electrical property (or a different electrical signature). Different electrical properties can be provided by differences in resistivity, capacitance, inductance, and the like. The connection 434 can be in any shape or made of any material to alter the electrical properties. For example, in some embodiments the electrical connection 434 is formed using a conductive ink and may be in the shape of various lines.

The package in FIG. 4 includes flaps 436, 438 disposed along an upper portion of the hole 428 with a notch between them. This is merely shown as one example in which the electrical contacts could be coupled to a package. In other embodiments, the contacts 430, 432 may be formed along an upper portion of the hole 428 without the use of flaps 436, 438. Further, embodiments of the present invention are not limited a use with a display hanger. A display hanger has been used in the examples above to illustrate various features and advantages of the invention. Other embodiments may be implemented, for example, on product shelving or in pop-up displays.

Figure 5:
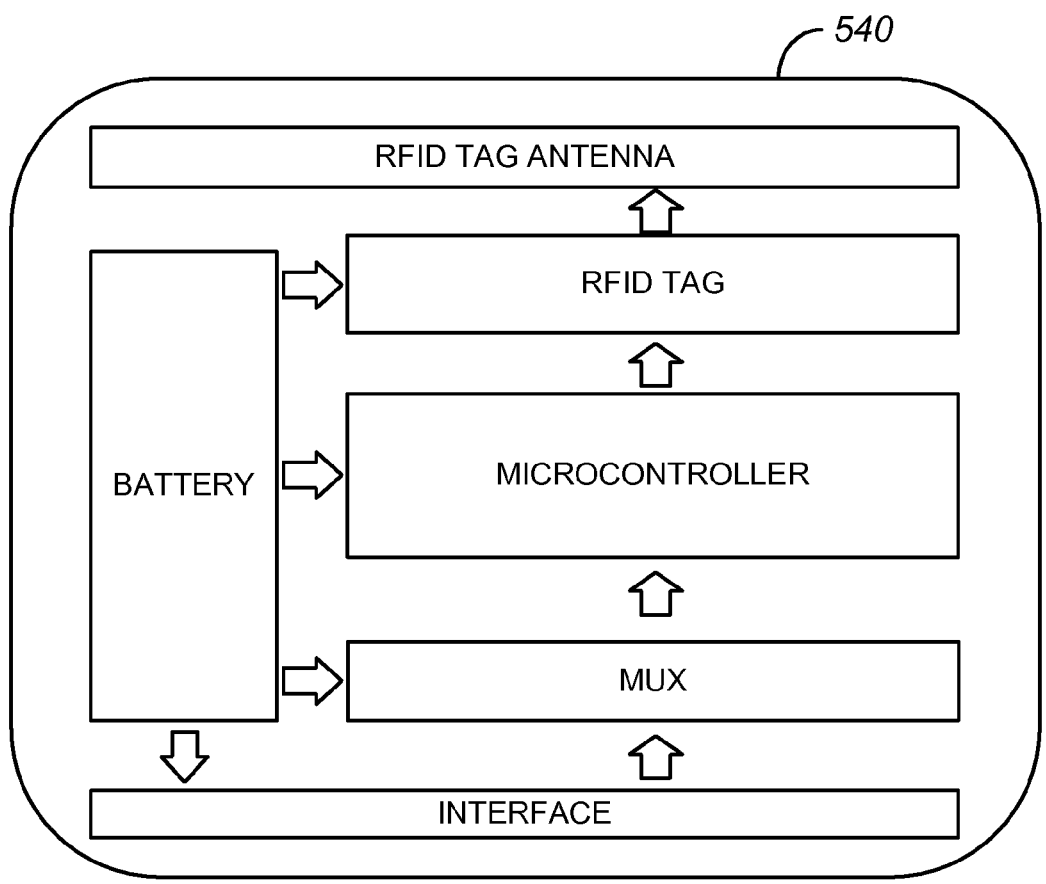
FIG. 5 is a simplified block diagram of a sensor device that may be used with embodiments of the invention.

FIG. 5 is a simplified block diagram of a sensor device that may be used with embodiments of the invention. Some embodiments of the invention provide for the storage and backhaul of data (e.g., transmitting the identity and quantity of different types of products). For example, after the sensing is completed by sensor device 540, the measurements may be filtered (if required) and stored for retrieval or broadcast. Embodiments are not tied to any one particular type of memory or backhaul method. Merely by way of example, data may be stored in the memory of an RFID tag and retrieved with a RFID reader for use upstream. Other data storage and transfer mechanisms can be used to achieve the same results. For example, the sensor device 540 may be configured to wirelessly communicate the data to a computing device using a Bluetooth, WiFi, ZigBee, or the like communication protocol. This can be advantageous in that cost and complexity of the backhaul and storage mechanism are part of the storage system not the product or packaging. The sensor device 540 may include other conventional electronic components depending on the configuration of the device, such as one or more batteries, interfaces, multiplexers, microcontrollers, RFID tag circuits, and RFID tag antennas as shown in this example.

Other embodiments of the invention capture data that can ultimately provide business intelligence about storage practices, consumer habits, or other analytics in addition to basic inventory levels. Using a display hanger as an example, the sensor device could detect when a consumer took a product off the display hanger and decided to place it back. The time, frequency, and duration of this event can be interpreted and recorded.

Figure 6:
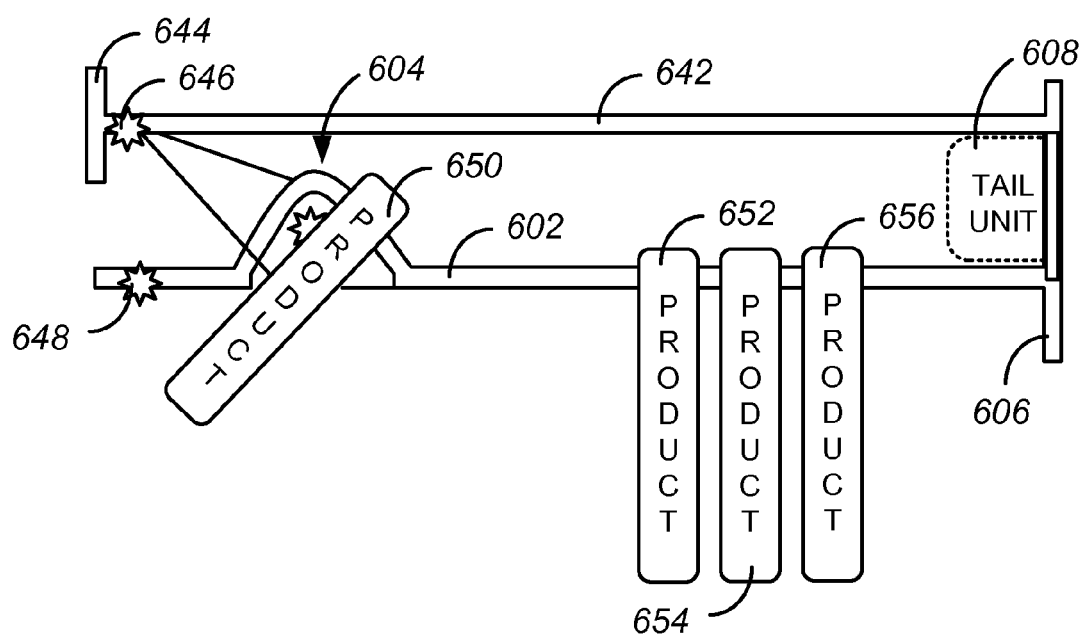
FIG. 6 is a simplified diagram of a storage system in accordance with another embodiment of the invention.

FIG. 6 is a simplified diagram of a storage system in accordance with another embodiment of the invention. Like FIG. 2, the storage system in this example includes a display hanger that may be used to support different types of products. The storage system can also be used for identifying the different types of products on the display hanger and for determining a quantity of each of the different types of products.

This example includes three products 652, 654, 656 that have been loaded onto a storage portion 602 of the display hanger and another product 650 that is being loaded onto the display hanger. As shown in this example, the curved choke-point 604 on the display hanger exposes a face of the product 650 as it is being loaded or unloaded. The position of the product 650 as it is moved over the choke point 604 provides an increased field of view (FOV) for an optical sensor 646. This embodiment may also include a direction sensor 648 near an end of the display hanger.

The optical sensor 646 may be used to identify characteristics on a face of the product 650 or the product's packaging as it is pushed back or pulled forward over the choke-point 604.

The optical sensor 646 can be disposed nearly out-of-sight from a user by placing it under an upper bracket 642 or behind a front plate 644 that may or may not be part of the display hanger. In some embodiments, each product type or product package may include markings using an ink that may be invisible to humans but than can be detected using an imaging device (e.g., a camera) and ultraviolet (UV) or infrared (IR) radiation. An image of the markings can be captured by the imaging device and deconstructed or analyzed using known techniques. The markings may be product specific to enable product identification (e.g., a SKU). In other embodiments, if the product or packaging design has sufficient unique, identifiable characteristics, UV or IR radiation may not be required. In these embodiments, patterns associated with the product or package may be detected using normal environmental radiation and know pattern recognition techniques.

If used, the direction sensor 648 may be a known "trip wire" type sensor that is placed close enough to a load/unload point to detect direction and movement of products. The direction sensor 648 can be used to track products as they are pushed onto or removed from the display hanger.

As shown in this example, a tail unit 608 (or sensor device) may be disposed near a base portion 606 of the display hanger and coupled to the optical sensor 646 and/or the direction sensor 648 using embedded wires or busses in the display hanger. The sensor device 608 may be configured to store data about inventory levels and product types in memory (e.g., in memory of an RFID tag or another memory location). The data may be accessible, for example, via RF or other wired or wireless protocols at described previously.

Figure 7:
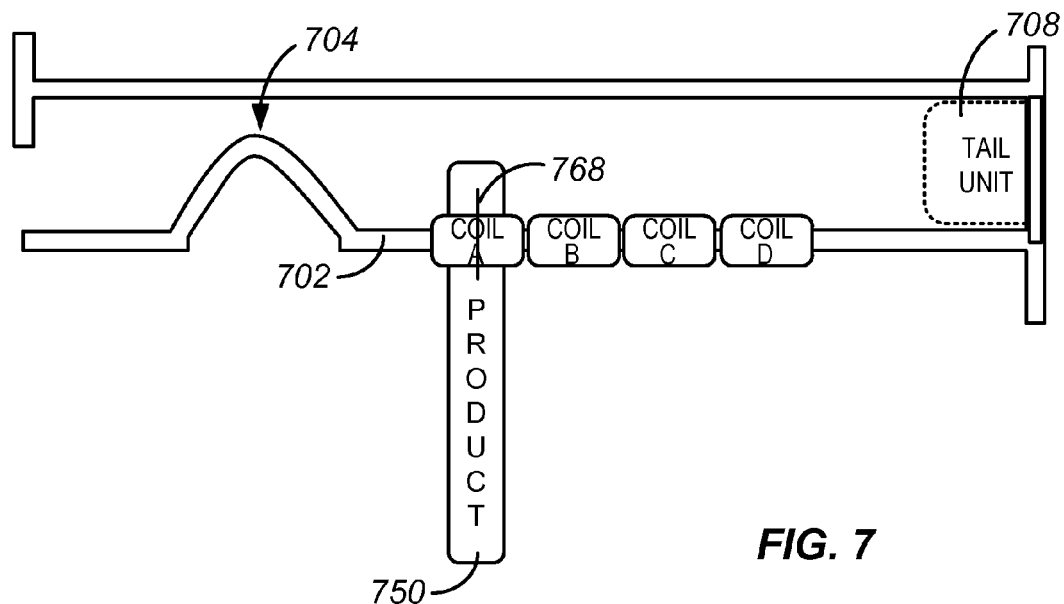
FIG. 7 is a simplified diagram of a storage system in accordance with yet another embodiment of the invention.

FIG. 7 is a simplified diagram of a storage system in accordance with another embodiment of the invention. This example shows a single product 750 hanging on a storage portion 702 of a display hanger at a location labeled COIL A. The coil is in reference to one or more coils (COIL A, COIL B, COIL C, COIL D) formed in or on the display hanger. Coils may also be disposed around a hole in the product 750 (such as coil 768—shown in side view). This arrangement enables product detection based on changes in resonant frequencies from the coils. In this embodiment, no physical contact between the product or package is necessary. In addition, slight shifts in angle or placement on the display hanger should not affect detection.

In this embodiment, each electrically conductive segment (COIL A, COIL B, COIL C, COIL D) includes a coil or another inductive structure. As an example, a wire wrapped around a surface of the display hanger forms a coil that is coaxial to the display hanger structure. Each coil may have a characteristic inductance (and/or other electrical properties) that provides a resonance frequency. By driving a specific coil with a time-varying electrical signal from sensor 708, the resonance frequency can be determined. Using the resonance frequency, a determination can be made by the sensor 708 as to whether the segment is unoccupied, occupied, and/or occupied with an identifiable product. Differences in magnitude and frequency of an electrical response can be measured to determine what type of product or package is present.

Figure 8:
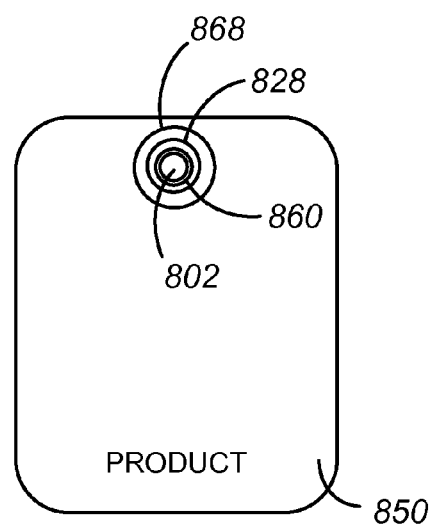
FIG. 8 is a simplified front view of a product or a portion of a package associated with a product in accordance with another embodiment of the invention.

In another embodiment, the product or package may include a detuning structure. Placing the product or package on the display hanger will detune a sensor coil in a distinguishable manner. In one implementation, a coil may be integrated into the product or package to encircle the sensor coil on the display hanger as illustrated in FIG. 8. FIG. 8 is a front view of a product 850 with a hole 828 that is hanging on a peg 802 (e.g., a storage portion of a display hanger). A coil 860 surrounds the peg 802, and a coil 868 is formed on or in the package. The package may be produced with the coil 868 inside or the coil 868 may be formed on the outside with, for example, conductive ink. Placement, length, and turns of the coil 868 will determine distortion of an electric field. Additional electrical elements (e.g., capacitive, resistive, non-linear, etc.) may also be added to the package to further modify an electrical response.

When a product or package is placed on a display hanger, the coil will line up with one of the electrically conductive segments (or coils) of the display hanger to form concentric circles. This arrangement provides maximum coupling between the coils. It may also provide enough efficiency to couple power from the display hanger into tag circuitry of the sensor device.

In some situations, it may be possible that a product or package will have a distinguishable electrical response even without additional circuitry (or by adding a minimal amount of circuitry to couple the natural structures of the display hanger). As in the operation of a metal detector, any type of electromagnetically responsive material will induce a detuning response. System cost may be reduced by taking advantage of structures already present in the product or package.

A tail unit (such as sensor device 708) may generate signals at various frequencies and measure returned signals from each segment across these frequencies. By observing how a particular type of product or package returns a specific test signal (through reflection, absorption, and/or other electrical effects), a product at that segment can be identified.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description but with reference to the appended claims along with their full scope of equivalents.

What is claimed is:

1. A system for monitoring inventory levels and product types, comprising:
 a display hanger having a choke-point and a storage portion, the choke point having portions that extend in different directions to form an extremum along the display hanger, and the storage portion extending substantially along a plane, wherein a product placed on the display hanger is moved past the extremum to the storage portion;

an optical sensor arranged to sense a characteristic of the product as the product is moved past the extremum on the display hanger; and a sensor device communicatively coupled to the optical sensor and configured to receive data from the optical sensor and to store quantities and types of products that are placed on and removed from the display hanger.

2. The system of claim 1 further comprising a direction sensor disposed on the display hanger, the direction sensor disposed on an opposite side of the choke-point from the storage portion, the direction sensor for determining if the product is placed on or removed from the display hanger.

3. The system of claim 2 wherein the direction sensor is communicatively coupled to the sensor device.

4. The system of claim 1 wherein the display hanger includes a loading portion disposed on an opposite side of the choke-point from the storage location, the loading portion extending substantially parallel to the plane.

5. The system of claim 1 wherein the portions of the choke point curve upward in different directions and the extremum of the choke point is a local maximum.

6. The system of claim 1 wherein the optical sensor is a camera configured to capture an image of the product, and the characteristic of the product is a marking on the product or on a package of the product.

7. The system of claim 1 wherein the sensor device includes a radio frequency identification (RFID) tag configured to communicate the quantities and types of products to an RFID reader device.

8. The system of claim 1 wherein the sensor device is configured to wirelessly communicate the quantities and types of products using a Bluetooth, WiFi, or ZigBee communication protocol.

9. A system for monitoring inventory levels and product types, comprising:
a display hanger having a loading portion, a choke-point, and a storage portion, the choke point having portions that extend in different directions to form an extremum along the display hanger, wherein a product placed on the display hanger is moved along the loading portion, past the extremum, and to the storage portion;
a direction sensor disposed on the loading portion of the display hanger, the direction sensor for determining if the product is placed on or removed from the display hanger;
an optical sensor arranged to sense a characteristic of the product as the product is moved past the extremum on the display hanger; and
a sensor device communicatively coupled to the optical sensor and to the direction sensor, the sensor device configured to receive data from the optical sensor and the direction sensor and to store quantities and types of products that are placed on and removed from the display hanger.

10. The system of claim 9 wherein the storage portion extends substantially along a plane, and the loading portion extends substantially parallel to the plane.

11. The system of claim 9 wherein the portions of the choke point curve upward in different directions and the extremum of the choke point is a local maximum.

12. The system of claim 9 wherein the optical sensor is a camera configured to capture an image of the product, and the characteristic of the product is a marking on the product or on a package of the product.

13. The system of claim 9 wherein the sensor device includes a radio frequency identification (RFID) tag configured to communicate the quantities and types of products to an RFID reader device.

14. The system of claim 9 wherein the sensor device is configured to wirelessly communicate the to a computing device using a Bluetooth, WiFi, or ZigBee communication protocol.

15. A method of identifying different types of products on a display hanger and determining a quantity of each of the different types of products, comprising:
sensing a characteristic of each product moved past a choke-point on the display hanger, the choke point having portions that extend in different directions to form an extremum along the display hanger;
identifying a type of each product based on the characteristic;
determining if each product is placed on or removed from the display hanger;
determining the quantity of each type of product on the display hanger; and
communicating the quantity of each type of product on the display hanger to an RFID reader device.

16. The method of claim 15 wherein the characteristic of each product is a pattern formed using an ink that is invisible to humans.

17. The method of claim 15 wherein the characteristic of each product is an SKU.

18. The method of claim 15 wherein the portions of the choke point curve upward in different directions and the extremum of the choke point is a local maximum.

19. The method of claim 15 wherein sensing the characteristic of each product includes capturing an image of each product and identifying the characteristic in the image using a pattern recognition technique.

20. The method of claim 15 wherein the characteristic is sensed using ultraviolet (UV) or infrared (IR) radiation.

* * * * *